Aug. 10, 1943.   H. W. STEINER   2,326,263

TANK FITTING

Filed April 26, 1941

INVENTOR
HUBBARD W. STEINER
BY
ATTORNEY

Patented Aug. 10, 1943

2,326,263

UNITED STATES PATENT OFFICE 2,326,263

TANK FITTING

Hubbard W. Steiner, Detroit, Mich., assignor to United States Rubber Company, New York, N. Y., a corporation of New Jersey Application April 26, 1941, Serial No. 390,437

4 Claims. (Cl. 220—63)

This invention relates to tank fittings and in particular it relates to means for forming a fluid tight joint between relatively flexible members and a rigid member, such as a conduit or filler connection or a rigid tank.

In the manufacture of tanks and particularly puncture sealing tanks which incorporate a plurality of flexible layers of puncture sealing material, much difficulty is encountered in the manner of securing fittings to such various layers at points where fittings are associated with the tank. In accordance with the practice of my invention, I provide a grommet-like structure of resilient composition having a pair of radially extending flanges adapted to embrace a plurality of layers including puncture sealing materials. The grommet includes a rigid annular member imbedded in the body of the grommet and provided with means with which the rigid annular member may be secured to an outer rigid casing. The same means may also function to secure the grommet to other parts ordinarily associated with tank fittings such as a filling cap and flange.

Among the objects of my invention are to provide a tank fitting in which laminations of puncture sealing layers are retained in their normal free state without the requirement of any clamping action; to provide a fitting which effectively seals the opening formed in tank lining materials so as to prevent the edges of the lining material from being exposed to the liquid contents of the tank; to provide a tank fitting which forms a permanent part of the tank lining and which may be easily attached to an outer supporting casing; and to provide a tank fitting which may be economically manufactured and readily assembled with its associated members. These and other objects and advantages will appear more fully in the following detailed description when considered in connection with the accompanying drawing, in which:

Figure 1:
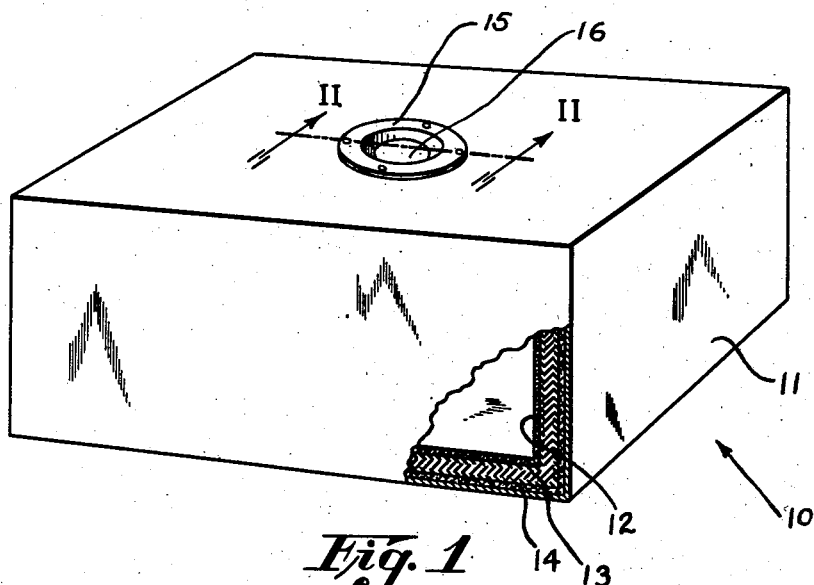
Fig. 1 is a perspective view of a tank, partly in section, embodying my invention.
Figure 2:
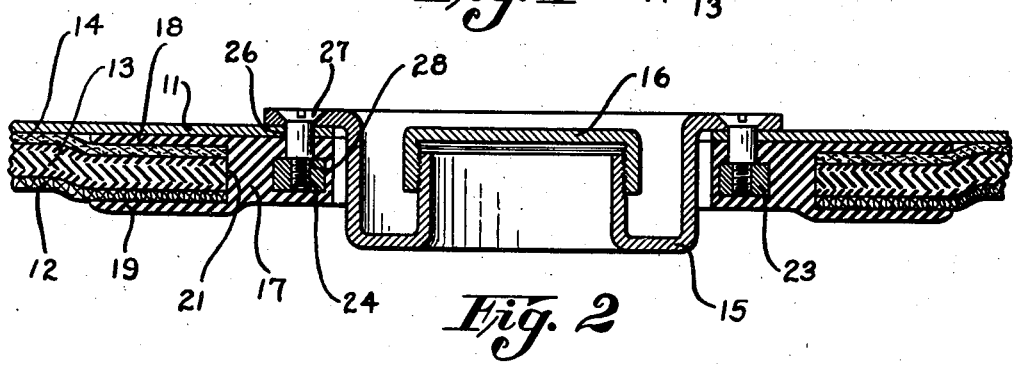
Fig. 2 is a view in section of a tank fitting assembly taken along lines II—II of Fig. 1.
Figure 3:
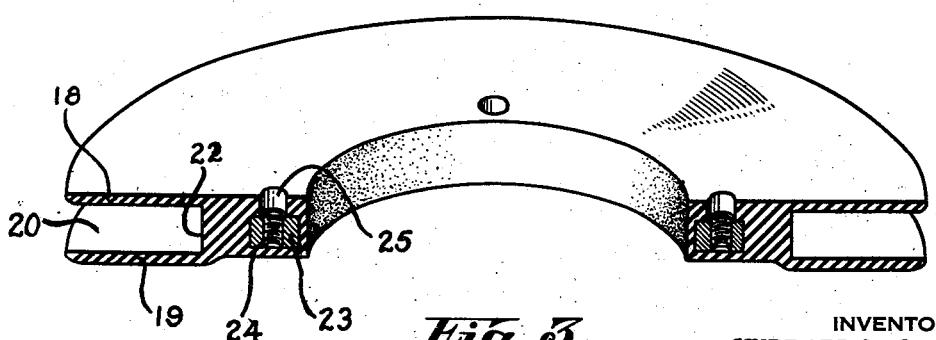
Fig. 3 is a perspective view, in section of a detail of a tank fitting.

Referring to the drawing, and in particular to Fig. 1, I show a tank in the form of a rectangularly shaped container 10. This tank includes an outer supporting casing 11 of a rigid material such as sheet metal. Lying adjacent the inner wall of the casing 11 is a puncture sealing lining formed of composite layers 12, 13, and 14. The present tank is particularly adapted as a fuel container for airplanes, for storing liquids such as gasoline. The composite layers 12, 13, and 14, function collectively to prevent large tears in the tank lining and to seal apertures formed in the lining by penetrating objects such as projectiles.

One example of a composite lining material includes the inner layer 12 formed of a duck fabric having its inner surface coated with a material such as neoprene which is resistant to the action of gasoline. The intermediate layer 13 is itself formed of composite laminations of rubber joined together in strained relationship so that compression stresses are present in the layer, the stresses causing a sealing action in the event the wall is punctured. The outer lining layer 14 is formed of sheet leather and is desirable because of its tear resisting characteristics. While I have described one form of puncture sealing lining, it is to be understood that various materials and various combinations of layers may be associated together to form the puncture sealing wall.

Various types of fittings are usually associated with gas tanks. For example, a filler passage may include a fitting such as a flange 15 and a filler cap 16. The flange 15 is fixed in rigid relationship with the tank 10 while the cap 16 is threaded thereto and is easily removable for the purpose of opening the filler passageway.

In order to join the composite puncture sealing lining formed of layers 12, 13, and 14 with the outer casing 11 and with the flange 15, I provide a grommet 17 which in general comprises an annular body portion having outwardly extending flanges 18 and 19 in spaced parallel relation to form an annular slot 20 for the reception of the lining material composed of laminated layers 12, 13, and 14. A circular opening 21 is cut through the lining material to form a circular opening corresponding to the diameter of the surface 22 forming the base of the opening 20 of the grommet 17.

Completely imbedded within the body portion of the grommet 17 is an annular ring 23 formed preferably of metal. A plurality of tapped holes 24 are machined in the ring 23, and apertures 25 extending through the body portion of the grommet 17 form passageways to the tapped holes 24 from the outer surface of the grommet.

The grommet 17 is preferably formed of a composition which is not ordinarily affected by contact with liquids such as gasoline. A satisfactory material for this purpose is neoprene. The grommet 17 together with the imbedded metallic ring 23 is formed as a unit in a molding operation during which the metal ring is secured in bonded and imbedded relation with the body of the grommet 17. In order to attach the grommet 17 to the puncture sealing lining material, the surfaces forming the slot 20 and the corresponding surfaces of the lining material, are coated with self-curing cement preferably a neoprene cement.

In assembling the grommet with the lining material, one of the flanges 18 or 19 of the grommet is distorted and forced through the opening 21 in the lining. Thereafter the flanges 18 and 19 are pressed firmly against the layers 14 and 12, respectively, until the adhesion of the cement on the respective surfaces forms a bonded action therebetween. The width of the slot 20 of the grommet 17 is slightly less than the total width of the composite lining formed of the layers 12, 13, and 14. When the grommet is attached to the lining material it forms a unit part thereof and after the lining is placed within the outer supporting inclosure 11, the openings 25 formed in the grommet 17 align with corresponding openings 26 through the wall of the tank inclosure 11.

Machine screws 27 extend through the openings 26 and 25 and engage in cooperative relation with the threaded holes 24 in the ring 22. This means of attachment secures the grommet 17 in a fixed relative position with the tank inclosure 11 and at the same time secures the flange 15. The machine screws 27 are provided with shoulder portions 28 which engage with the top surface of the metal ring 23 to limit the amount of compression imparted to the neoprene composition of the grommet which lies between the top of the ring 23 and the inner surface of the tank inclosure 11. The thickness of the resilient material between these surfaces is such that a substantial degree of compression will be exerted on the composition of the grommet 17 when the machine screws 27 are tightened in place. This leaves the entire remaining portion of the grommet 17 and flanges 18 and 19 relatively free of compression stresses.

While I have illustrated my invention as being adapted for use in connection with an inlet passageway, it is to be understood that the grommet construction may be used for other tank openings such as tank outlets, hand holds, pipe connections and the like, and therefore, the invention is susceptible of those modifications which appear within the spirit of the invention and the scope of the appended claims.

Having thus described my invention, what I claim and desire to protect by Letters Patent is:

1. A tank structure comprising a puncture sealing container having an opening therein, a resilient annular body positioned within the opening, a pair of spaced resilient flanges formed integral with said annular body and extending radially outward therefrom and secured to opposite surfaces of the puncture sealing container, a ring of rigid material adapted to have screw threads formed therein imbedded within the annular body, an outer casing for supporting the container, and means for securing the ring to the outer casing.

2. A tank structure comprising a puncture sealing container having an opening therein, a neoprene annular body positioned within the opening, a pair of spaced neoprene flanges formed integral with the annular body and extending radially outward therefrom and secured to opposite surfaces of the puncture sealing container, a ring of rigid material adapted to have screw threads formed therein imbedded within the annular body, an outer casing for supporting the container, and means for securing the ring to the outer casing.

3. A tank structure comprising a puncture sealing container having an opening therein, a resilient annular body positioned within the opening and having spaced holes therein, a pair of spaced resilient flanges formed integral with the annular body and extending radially outward therefrom and secured to opposite surfaces of the puncture sealing container, a ring of rigid material having threaded openings and imbedded within the annular body, an outer casing for supporting the container, and means for securing the ring to the outer casing, said securing means comprising shouldered machine screws extending through said holes into said openings to provide a controlled compression of the resilient material lying between the ring and the outer casing.

4. A tank structure comprising a resilient container having an opening therein, a resilient annular body positioned within the opening, a pair of spaced resilient flanges formed integral with the annular body and extending radially outward therefrom and secured to opposite surfaces of the container, a ring of rigid material adapted to have screw threads formed therein and imbedded within the annular body, an outer casing for supporting the container, and means extending through the casing and a portion of the resilient body and into the said ring for securing the ring to the outer casing.

HUBBARD W. STEINER.